United States Patent [19]

Miles et al.

[11] Patent Number: 5,516,462

[45] Date of Patent: May 14, 1996

[54] ENHANCED CYCLE LIFETIME ELECTROCHROMIC SYSTEMS

[75] Inventors: Melvin H. Miles; Ronald A. Henry; Dwight A. Fine, all of Ridgecrest, Calif.

[73] Assignee: The United States of America as represented by the Secretary of the Navy, Washington, D.C.

[21] Appl. No.: 32,877

[22] Filed: Mar. 18, 1993

Related U.S. Application Data

[63] Continuation of Ser. No. 533,655, Jun. 5, 1990, abandoned.

[51] Int. Cl.$^6$ ........................................ G02F 1/00
[52] U.S. Cl. ............................................ 252/583
[58] Field of Search .......................... 252/583, 586, 252/600; 359/272

[56] References Cited

U.S. PATENT DOCUMENTS

| | | | |
|---|---|---|---|
| 4,116,535 | 9/1978 | Ponjee et al. | 252/583 |
| 4,192,581 | 3/1980 | Yaguchi et al. | 252/583 |

OTHER PUBLICATIONS

Hirohashi et al., Nippon Shashin Gakkaishi, vol. 51, No. 1, pp. 9–15, (1988).

Miles et al., Proc.–Electrochem. Soc. 90–2 (Proc. Symp. Electrochromic Mater., 1989) pp. 137–156 (1990).

*Primary Examiner*—Philip Tucker
*Attorney, Agent, or Firm*—Stephen J. Church; Melvin J. Sliwka; John J. Forrest, Jr.

[57] ABSTRACT

Electrochromic systems providing enhanced cycle lifetime. The increase in cycle lifetime is a product of one or more of the following: novel or known asymmetric viologen compounds, mixed electrolyte systems, and mixed solvent systems.

14 Claims, No Drawings

ENHANCED CYCLE LIFETIME ELECTROCHROMIC SYSTEMS

This is a continuation of application Ser. No. 07/533,655 filed on Jun. 5, 1990 now abandoned.

BACKGROUND

The present invention relates to electrochromic devices (hereinafter referred to as ECDs) and, more particularly to viologen compounds and mixed electrolyte systems of aqueous solutions of electrochromic viologen compounds used in ECDs which have a long life and short response time.

Specialized missiles require an "iris" to rapidly attenuate light intensity. Over the lifetime of the missile, this can easily involve over 100,000 cycles. Mechanical devices are subject to failure resulting from G-force stresses and the wear and corrosion of moving parts. Furthermore, mechanical devices add to the weight and are subject to the space limitations of the missile. A self-contained electrochemical system would have no moving parts and would be limited only by the stability of the materials and the reversibility of the electrochemical reactions. An electrochemical light attenuation device could be simply constructed in the form of a thin disk; thus, yielding a savings of space, weight and cost.

In missile applications such a device requires faster switching time (1 Hz) and a smaller size (5 cm$^2$) than required for commercial applications. Long-term stability (5–10 years) and good reversibility (100,000 cycles) are also important characteristics for missile applications. Another requirement is that light transmitted by this device should have good optical quality.

Solutions of viologen compounds are used for the reversible deposition of highly colored films at an electrode surface. The electrochromic effect requires the reduction of the colorless aqueous solution of the dicationic viologen salt to a highly colored insoluble radical ion salt that is deposited as a film on the cathode. The film will remain fixed on the electrode surface but may be rapidly erased by reversing the current which oxidizes the film back to soluble species.

The major advantages of viologen electrochromic systems include fast response time, a low operating voltage, and the complete removal of the film upon oxidation to give maximum light transmittance. The electrode process for film formation or removal require only a few tenths of a second for small active areas.

The major problem with viologen systems is that an aging or crystallization effect limits the number of reversible cycles that can be obtained. After repeated cycling, films gradually assume a greater degree of optical anisotropy, consistent with the reorientation of the molecules to a higher degree of ordering. The formation of polycrystalline conglomerates has also been noted. This aging process results in a drop in erase efficiency.

The prior art has focused on the commercially available dimethyl and diheptyl viologens, and has primarily used aqueous solutions of potassium bromide. The molecular structure of the viologen and the nature of the anion are known to affect the stability of the radical ion salt film. One study examined replacing the commonly used bromide anion with dihydrogen phosphate. R. J. Jasinski, *J. Electrochem. Soc.*, 124, 637 (1977). Another study examined the influence of molecular structure on the stability of the radical ion salt film, J. A. Barltrop and A. C. Jackson, *J. Chem. Soc, Perkin Trans. II*, 367 (1984); however, the detrimental effects of aging have not been significantly reduced. Consequently, the highest number of reversible cycles reported in the literature for viologen materials is 20,000 cycles.

It is therefore one object of this invention to provide an electrochromic system capable of completing over 20,000 reversible cycles.

Another object of this invention is to provide an electrochromic system which can be used in a small, lightweight electrochromic device.

A further object of this invention is to provide an electrochromic system which is capable of supporting fast, repeatable cycles.

A still further object of this invention is to provide novel viologen compounds.

It is still another object of this invention to provide novel viologen compounds which can be used in the above electrochromic system.

It is yet another object of this invention to provide novel electrolyte systems for use in electrochromic systems.

It is still a further object of this invention to provide novel solvent systems-for use in electrochromic systems.

SUMMARY OF THE INVENTION

The above objects are met by the present invention. According to the invention, using various combinations of novel and known viologen compounds, novel electrolyte systems, and new mixed solvent systems, electrochromic systems can be made which are stable, fast and can sustain at least four fold as many reversible cycles as previous electrochromic systems (over 80,000 cycles as compared to the prior art maximum of about 20,000 cycles). This dramatic increase in cycle lifetime is attributable to new compounds, new electrolyte solutions, and new solvent mixtures.

The present invention provides, novel, asymmetric, sterically modified viologen compounds which disfavor the recrystallization (aging) process of previous compounds associated with a molecular reorientation of the viologen compounds in an electrochromic system to a more highly ordered structure; thereby, increasing stability and cycle lifetime. These compounds were synthesized using methods similar to methods known in the art.

The present invention also provides novel, mixed electrolyte systems which can include potassium bromide (KBr), potassium chloride (KCl), potassium nitrate (KNO$_3$), potassium sulfate (K$_2$SO$_4$), and potassium acetate (KC$_2$H$_3$O$_2$). The use of a mixed electrolyte system in an electrochromic system can greatly increase the number of reversible electrochromic cycles. Additionally, a novel solvent system, containing a mixture of solvents, has also been shown to increase the number of cycles possible. These solvent systems can contain water mixed with DMSO, acetone, ethanol, acetonitrile, 1-propanol, propylene glycol, or ethylene glycol. In fact when an asymmetric viologen was combined with a mixed electrolyte system in a mixed solvent system, an electrochromic system capable of over 100,000 cycles has been demonstrated.

DETAILED DESCRIPTION AND PREFERRED EMBODIMENTS

As indicated above, altering the symmetry of the viologen compound, the electrolyte system and/or the solvent system can result in a dramatic increase in cycle lifetime.

Several novel, viologen compounds were produced by varying the substituents of the 4,4'-bipyridium structure:

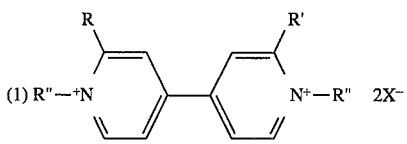

(1) $R''-^+N$ ⟨⟩—⟨⟩ $N^+-R''$ $2X^-$ where:

(2) R=H, R'=H, and R''= p-MeC$_6$H$_4$CH$_2$;

(3) R=H, R'=H, and R''= p-CH$_3$OC$_6$H$_4$CH$_2$;

(4) R=H, R'=H, and R''=C$_6$Me$_5$CH$_2$ (pentamethylbenzyl)

(5) R=CH$_3$, R'=CH$_3$, and R''=o-MeC$_6$H$_4$CH$_2$

The following examples are presented to illustrate typical and preferred compositions of the present invention, their methods of manufacture, and their methods of use. The following examples of practice of the invention are understood as being illustrative and are not intended as limitative of the invention.

EXAMPLE 1

In a preparation essentially the same as the procedure described in J. A. Barltrop and A. C. Jackson, *J. Chem. Soc. Perkin Trans. II*, 367 (1984), a solution of 3.5 mole equivalents of 4-methylbenzyl bromide and 1 mole equivalent of 4,4'-bipyridine in acetonitrile was heated at reflux with stirring. The precipitated salt was collected and washed with acetonitrile and ether and the product was recrystallized from a 5:1 mixture of ethanol/methanol. The crystals were dried in vacuo. Anal. Calc'd. for $C_{26}H_{26}Br_2N_2 \cdot H_2O$: Br, 29.36; N 5.15. Found: Br, 29.65; N, 5.12.

EXAMPLE 2

The process of Example 1 was substantially followed except 3.3 mole equivalents of 4-methoxybenzyl chloride was substituted for the 4-methylbenzyl bromide. Anal. Calc'd. for $C_{26}H_{26}Cl_2N_2O_2 \cdot H_2O$: C, 64.06; H, 5.29; Cl, 14.55; N 5.75. Found: C, 65.38; H, 5.90; Cl, 14.61; N, 5.64, 5.75.

EXAMPLE 3

The process of Example 1 was substantially followed except 2.0 mole equivalents of pentamethylbenzyl chloride was substituted for the 4-methylbenzyl bromide. Anal. Calc'd. for $C_{34}H_{42}Cl_2N_2O_2 \cdot C_2H_5OH$: Cl, 11.91; N 4.76. Found: Cl, 12.07; N, 4.57, 4.73.

EXAMPLE 4

The process of Example 1 was substantially followed except 3.5 mole equivalents of 2-methylbenzyl bromide was substituted for the 4-methylbenzyl bromide and 1 mole equivalent of 2,2'-dimethyl-4,4'-bipyridine was substituted for the 2-methyl-4,4'-bipyridine. Anal. Calc'd. for $C_{28}H_{30}Br_2N_2$ : Br, 28.83; N 5.0. Found: Br, 29.06; N, 5.18.

EXAMPLE 5

Examples of various new and known viologen compounds were investigated for cycle lifetime. These experiments were performed using 0.005 molal solutions of viologen in 0.20 KBr aqueous solutions. Platinum wire electrodes were used (previous studies have shown that results are similar for many electrode materials including ITO glass).

The results have been summarized in Table I below.

TABLE I

| | Compound[a] | | Cycles |
|---|---|---|---|
| [A] | | R = H, R' = H, R" = C$_6$H$_5$CH$_2$ | 10 |
| [B] | (2)[b] | R = H, R' = H, R" = p-MeC$_6$H$_4$CH$_2$ | 10 |
| [C] | (3) | R = H, R' = H, R" = p-CH$_3$OC$_6$H$_4$CH$_2$ | 500 |
| [D] | | R = H, R' = H, R" = C$_7$H$_{15}$ | 30 |
| [E] | | R = H, R' = H, R" = o-MeC$_6$H$_4$CH$_2$ | 6,000 |
| [F] | (5) | R = CH$_3$, R' = CH$_3$, R" = o-MeC$_6$H$_4$CH$_2$ | 100 |
| [G] | | R = H, R' = CH$_3$, R" = o-MeC$_6$H$_4$CH$_2$ | 10,000 |
| [H] | | R = H, R' = H, R" = C$_6$H$_{13}$ | 2000 |

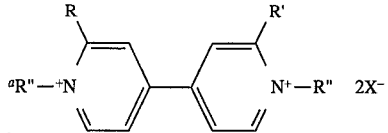

[a] $R''-^+N$ ⟨⟩—⟨⟩ $N^+-R''$ $2X^-$

[b] Numbers refer to novel compounds above.

EXAMPLE 6

Various viologen compounds were investigated using various electrolyte systems. Platinum electrodes were used in aqueous solutions. Each of the electrolyte systems contained two or more of the electrolytes selected from the group consisting of: KBr, KCl, KNO$_3$, KC$_2$H$_3$O$_2$, and K$_2$SO$_4$. The concentrations of each individual electrolyte in the system can range from 0 molal to the solubility limit of each electrolyte in a particular mixed electrolyte system. These experiments are summarized below in Table II.

TABLE II

| | Electrolyte | Cycles | |
|---|---|---|---|
| Compound[c] | Mixture[d] | 0.20 m KBr | Mixture |
| A | 0.20 KBr + 0.50 KNO$_3$ + 0.20 KCl + 0.50 KC$_2$H$_3$O$_2$ | 10 | 10 |
| D | 0.20 KBr + 0.50 KNO$_3$ + 0.20 KCl + 0.50 KC$_2$H$_3$O$_2$ | 30 | 30 |
| H | 0.20 KBr + 0.20 KCl + 0.50 KC$_2$H$_3$O$_2$ | 2,000 | 2,000 |
| F | 0.20 KBr + 0.20 KNO$_3$ + 0.50 KC$_2$H$_3$O$_2$ | 100 | 2,000 |
| E | 0.20 KBr + 0.20 KCl | 6,000 | 2,000 |
| G | 0.20 KCl + 0.50 KNO$_3$ | 10,000 | 7,000 |
| E | 0.20 KBr + 0.20 KCl + 0.50 KNO$_3$ + 0.50 KC$_2$H$_3$O$_2$ | 6,000 | 20,000 |
| G | 0.20 KBr + 0.20 KNO$_3$ + 0.50 KC$_2$H$_3$O$_2$ | 10,000 | 80,000 |
| G | 0.20 KCl + 0.50 KNO$_3$ + 0.50 KC$_2$H$_3$O$_2$ | 10,000 | 88,000+ |

[c] Compound reference from Table I.
[d] Concentration in moles/Kg solvent (molal).

Solutions containing compound [G] show excellent stability (i.e., no crystallization) over several months.

EXAMPLE 7

Additionally, the effects on electrochromic cycles of different solvent systems were determined using viologen compound [E] (reference from Table I). These tests were performed using an ITO electrode in 0.20 m KNO$_3$+0.20 m K$_2$SO$_4$ and are summarized in Table III below.

TABLE III

| Solvent[e] | Observed cycles |
|---|---|
| Water | 4,000 |
| Water-DMSO | 3,000 |

TABLE III-continued

| Solvent[e] | Observed cycles |
|---|---|
| Water-acetone | 5,000 |
| Water-ethanol | 6,000 |
| Water-acetonitrile | 8,000 |
| Water-1-propanol | 14,000 |
| Water-propylene glycol | 28,000 |
| Water-ethylene glycol | 34,000 |

[e]Mixed solvents contained 10 weight percent of the second component.

EXAMPLE 8

Studies using compound [G] in solutions containing a mixed electrolyte system of 0.20 m $KNO_3$ and 0.20 m $K_2SO_4$ and a mixed solvent system of water and ethylene glycol have demonstrated well over 100,000 reversible cycles.

From the foregoing, it is seen that the invention provides for the preparation of novel asymmetric viologen compounds, novel mixed electrolyte systems, and mixed solvent systems. These compounds and systems can be used in electrochromic systems and dramatically increase the cycle lifetime.

Since various changes and modifications can be made in the invention without departing from the spirit of the invention, the invention is not to be taken as limited except by the scope of the appended claims.

What we claim is:

1. An electrochromic system having an enhanced reversible electrochromic cycle lifetime comprising:

an electrochromic viologen compound; and, a mixed electrolyte system, wherein said mixed electrolyte system is comprised of a solvent and a combination of two or more electrolytes selected from the group of combinations consisting of: $KBr/KC_2H_3O_2$, $KBr/K_2SO_4$, $KCl/KNO_3$, $KCl/KC_2H_3O_2$, $KCl/K_2SO_4$, $KNO_3/KC_2H_3O_2$, $KNO_3/K_2SO_4$, $KC_2H_3O_2/K_2SO_4$, $KBr/KCl/KNO_3$, $KBr/KCl/KC_2H_3O_2$, $KBr/KCl/K_2SO_4$, $KBr/KNO_3/KC_2H_3O_2$, $KBr/KNO_3/K_2SO_4$, $KBr/KC_2H_3O_2/K_2SO_4$, $KCl/KNO_3/KC_2H_3O_2$, $KCl/KNO_3/K_2SO_4$, $KCl/KC_2H_3O_2/K_2SO_4$, $KNO_3/KC_2H_3O_2/K_2SO_4$, $KBr/KCl/KNO_3/KC_2H_3O_2$, $KBr/KCl/KNO_3/K_2SO_4$, $KBr/KCl/KC_2H_3O_2/K_2SO_4$, $KCl/KNO_3/KC_2H_3O_2/K_2SO_4$, $KBr/KNO_3/KC_2H_3O_2/K_2SO_4$, and $KBr/KCl/KNO_3/K_2SO_4/KC_2H_3O_2$, wherein the reversible cycle lifetime is in excess of that obtainable using a single electrolyte system.

2. The electrochromic system of claim 1 wherein said viologen compound is 1,1'-bis-(2-methylbenzyl)-2-methyl-4,4'-bipyridine.

3. The electrochromic system of claim 1, wherein said viologen compound is:

$$R''-{}^+N \underset{}{\underset{}{\bigcirc}}-\underset{}{\underset{}{\bigcirc}} N^+-R'' \quad 2X^-$$

(with R and R' substituents)

wherein X is a mono-valent negative ion;

wherein R and R' are selected from the group consisting of H and $CH_3$; and, wherein R'' is an ortho-substituted benzyl.

4. The electrochromic system of claim 1, further comprising a mixed solvent system, wherein said mixed solvent system is comprised of water and a non-water component comprised of at least one of the solvents selected from the group consisting of DMSO, acetone, ethanol, acetonitrile, 1-propanol, propylene glycol, and ethylene glycol, wherein said non-water component is less than 25 weight percent of the mixed solvent, and wherein the reversible cycle lifetime is in excess of that obtainable using a single solvent system.

5. The electrochromic system of claim 1, wherein said combination of electrolytes is comprised of 0.20 molal KCl, 0.50 molal $KNO_3$, and 0.50 molal $KC_2H_3O_2$, and wherein said viologen compound is 1,1'-bis-(2-methylbenzyl)-2-methyl-4,4'-bipyridine.

6. The electrochromic system of claim 1, wherein said electrolyte combination is 0.20 m $KNO_3$ and 0.20 m $K_2SO_4$, and wherein said viologen compound is 1,1'-bis-(2-methylbenzyl)-2-methyl-4,4'-bipyridine.

7. The electrochromic system of claim 1, wherein said mixed electrolyte system is comprised of a solvent and a combination of three or more electrolytes selected from the group of combinations consisting of: $KBr/KCl/KNO_3$, $KBr/KCl/KC_2H_3O_2$, $KBr/KCl/K_2SO_4$, $KBr/KNO_3/KC_2H_3O_2$, $KBr/KNO_3/K_2SO_4$, $KBr/KC_2H_3O_2/K_2SO_4$, $KCl/KNO_3/KC_2H_3O_2$, $KCl/KNO_3/K_2SO_4$, $KCl/KC_2H_3O_2/K_2SO_4$, $KNO_3/KC_2H_3O_2/K_2SO_4$, $KBr/KCl/KNO_3/KC_2H_3O_2$, $KBr/KCl/KNO_3/K_2SO_4$, $KBr/KCl/KC_2H_3O_2/K_2SO_4$, $KCl/KNO_3/KC_2H_3O_2/K_2SO_4$, $KBr/KNO_3/KC_2H_3O_2/K_2SO_4$, and $KBr/KCl/KNO_3/K_2SO_4/KC_2H_3O_2$.

8. The electrochromic system of claim 1, wherein said viologen compound is 1,1'-bis-(2-methylbenzyl)-2-methyl-4,4'-bipyridine and, wherein said system has a cycle lifetime of greater than 20,000 reversible cycles.

9. An electrochromic system having an enhanced reversible electrochromic cycle lifetime, the system comprising:

an electrochromic viologen compound;

a solvent consisting of water and at least one non-water component selected from the group consisting of DMSO, acetone, acetonrile, 1-propanol, propylene glycol, and ethylene glycol; and electrolytes soluble in said solvent to release therein at least two kinds of anions selected from the group consisting of bromide, chloride, nitrate, sulfate, and acetate anions, each of said electrolytes being a salt present in said solvent in a proportion of at least 0.20 mole per kilogram of solvent.

10. The electrochromic system of claim 9 wherein said electrolytes are salts of an alkaline metal.

11. The electrochromic system of claim 10 wherein said alkaline metal is potassium.

12. The electrochromic system of claim 9 wherein said viologen compound includes the 1,1',-bis-(2-methylbenzyl)-4,4'-bipyridine structure.

13. The electrochromic system of claim 12 wherein said viologen compound is 1,1',-bis-(2-methylbenzyl)-2-methyl-4,4'-bipyridine.

14. The electrochromic system of claim 9 wherein:

said electrolytes are salts of an alkaline metal; and said viologen compound is a 1,1',-bis-(2-methylbenzyl)-2-methyl- 4,4'-bipyridine.

* * * * *